(12) United States Patent
Yagi et al.

(10) Patent No.: US 6,236,438 B1
(45) Date of Patent: May 22, 2001

(54) OPTICAL VISUALIZING APPARATUS

(75) Inventors: Tetsuya Yagi; Isao Sawachika, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/845,464

(22) Filed: Apr. 25, 1997

(30) Foreign Application Priority Data

May 15, 1996 (JP) .................................................. 8-120644

(51) Int. Cl.[7] ........................ G02F 1/1335; C09K 19/02; G02B 27/14
(52) U.S. Cl. .............................. 349/13; 349/180; 359/630
(58) Field of Search .................................. 349/13, 96, 15, 349/33, 180, 179; 359/630, 631, 633

(56) References Cited

U.S. PATENT DOCUMENTS

| | | | |
|---|---|---|---|
| 5,526,184 | * | 6/1996 | Tokuhashi et al. ................... 359/630 |
| 5,539,578 | * | 7/1996 | Togino et al. ........................ 359/630 |
| 5,699,133 | * | 12/1997 | Furuta ................................... 349/13 |
| 5,706,137 | * | 1/1998 | Kelly .................................... 359/633 |
| 5,777,794 | * | 7/1998 | Nakaoka ............................... 359/632 |
| 5,796,524 | * | 8/1998 | Oomura ................................ 359/633 |

* cited by examiner

*Primary Examiner*—William L. Sikes
*Assistant Examiner*—Dung Nguyen
(74) *Attorney, Agent, or Firm*—Ronald P. Kananen; Rader, Fishman & Grauer

(57) ABSTRACT

The characteristic of a visual-field angle is improved by improving a characteristic of the contrast of a liquid-crystal display element employed in a head mounted display apparatus which is used as an optical visualizing apparatus mounted on the head of an image viewer for viewing an image appearing in front of both eyes of an image viewer. The liquid-crystal display element for displaying an image comprises a liquid-crystal board as well as first and second polarizing boards sandwiching the liquid-crystal board wherein the polarization directions of the first and second polarizing boards are inclined in a slanting orientations so that the contrast characteristic in the horizontal direction can be kept unchanged while the characteristic of the contrast in the vertical direction can be changed. In this way, the angle of the visual field can be enhanced.

7 Claims, 7 Drawing Sheets

FIG. 4A  FIRST POLARIZING BOARD

FIG. 4B  LIQUID-CRYSTAL BOARD

FIG. 4C  SECOND POLARIZING BOARD

OPTICAL VISUALIZING APPARATUS

BACKGROUND OF THE INVENTION

1. Field of the Invention

In general, the present invention relates to an optical visualizing apparatus attached to the head of equipment such as an HMD (head mounted display) apparatus for viewing an image in front of a face. In particular, the present invention relates to an optical visualizing apparatus wherein a liquid crystal employed therein has the contrast of the visual-field angle thereof with an improved characteristic.

2. Description of the Related Art

Figure 1:
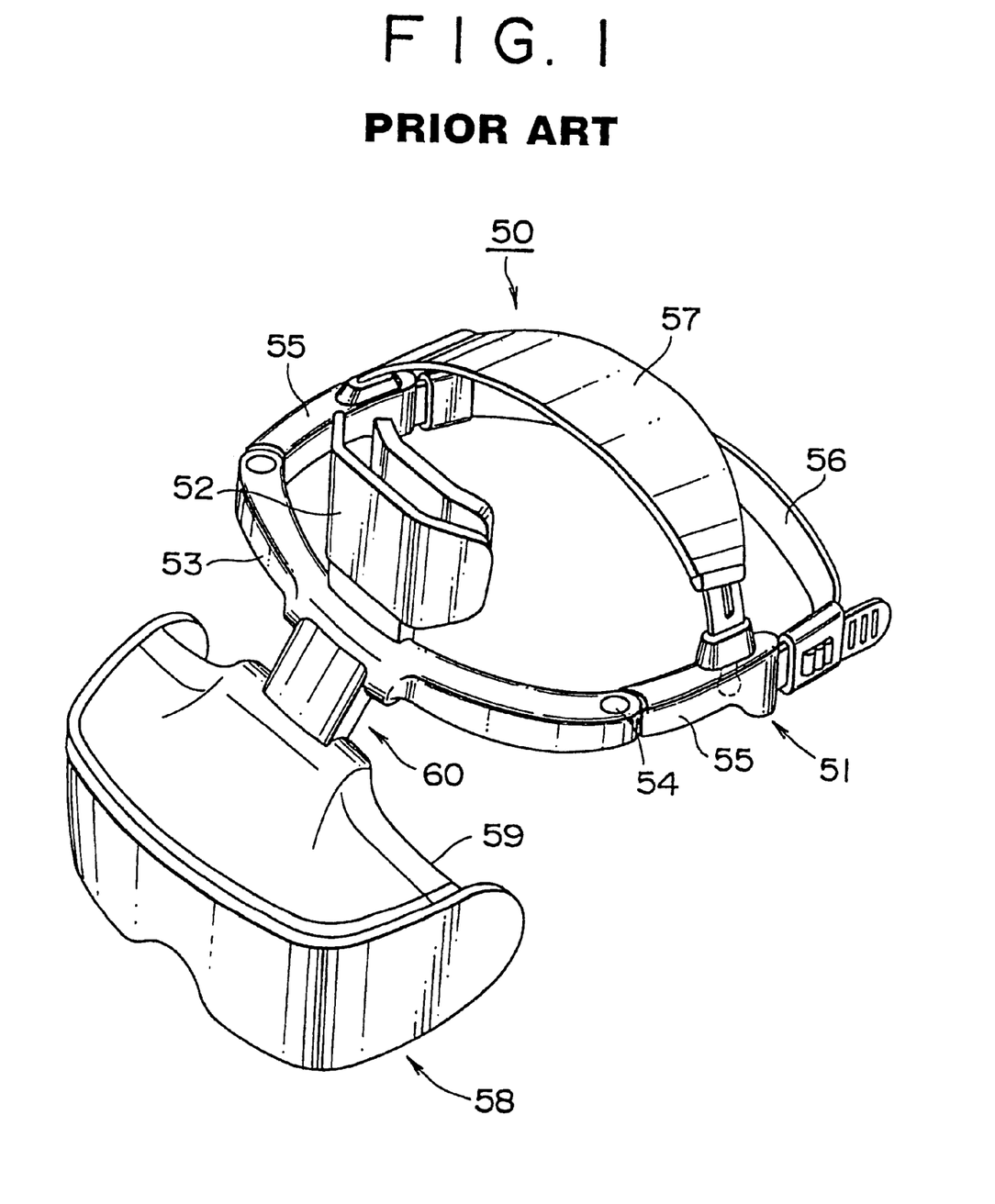
FIG. 1 is a diagram showing the entire configuration of an optical visualizing apparatus used as an HMD (head mounting display) apparatus.

FIG. 1 is a diagram showing an optical visualizing apparatus 50 used as an HMD (head mounted display) apparatus for viewing an image displayed by a liquid crystal in front of the eyes of an image viewer. As shown in the figure, the optical visualizing apparatus 50 comprises a head mounting unit 51 for supporting a display unit 58 in front of the eyes of an image viewer, the display unit 58 mounted in front of the eyes of an image viewer, standing face to face with the eyes of an image viewer, for projecting an image on both eyes of an image viewer and a linking unit 60 for linking the display unit 58 to the head mounting unit 51 and holding the display unit 58 in front of the eyes of an image viewer.

The head mounting unit 51 comprises a head supporting member 53 for supporting a forehead pad 52 brought into contact with the forehead, a pair of side cabinets 55 linked with the head supporting member 53 through hinges 54 at the ends of the head supporting member 53, a head-circumference adjustable belt 56 adjustably connected to ends of the side cabinets 55 and a hair band 57 adjustably supported by the side cabinets 55 and provided on the head. Linked to one end of the linking unit 60, the head mounting unit 51 has a curved shape approximately resembling the circumference of the head.

The display unit 58 comprises a cabinet with a shape approximately resembling goggles serving as a cover veiling the front face and a display body 59 protected by this cover.

Figure 2:
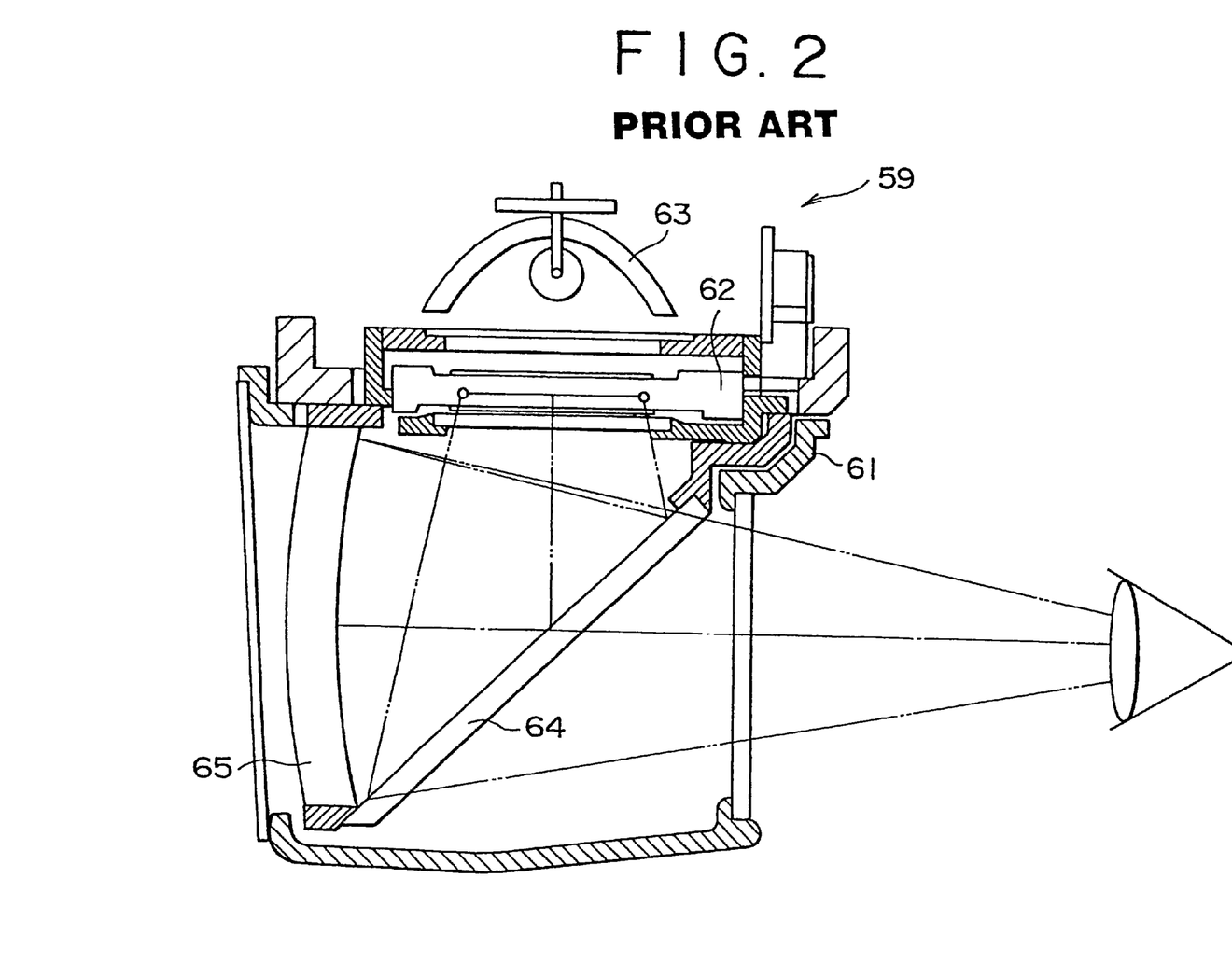
FIG. 2 is a diagram showing in a simplified way a cross section of a display body employed in the optical visualizing apparatus shown in FIG. 1.

FIG. 2 is a diagram showing the display body 59. As shown in the figure, the display body 59 comprises a cabinet 61, a liquid-crystal display element 62 for displaying an image inside the cabinet 61, a light-source unit 63 for supplying light to the liquid-crystal display element 62, a half mirror 64 capable of changing the optical path of an image from the liquid-crystal display element 62 and passing on the optical path and a concave mirror 65 for observing and enlarging the virtual image of a light beam with the optical path thereof changed by the half mirror 64.

Figure 6:
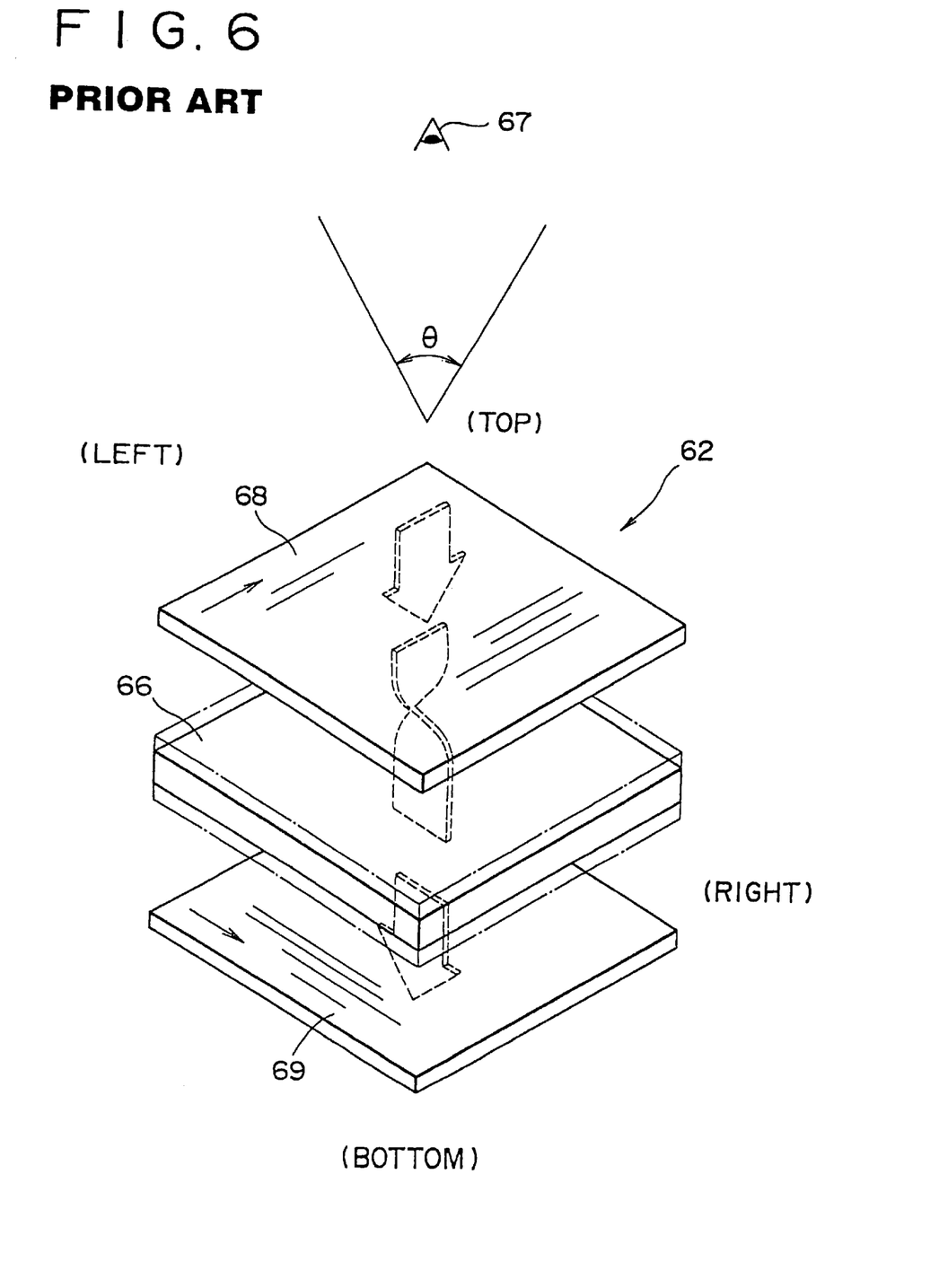
FIG. 6 is a an exploded view representation of the structure of the liquid-crystal display element provided by the related art.

FIG. 6 is a diagram showing the liquid-crystal display element 62. As shown in the figure, the liquid-crystal display element 62 comprises a liquid-crystal board 66 with a square shape for generating an image, a first polarizing board 68 provided above the liquid-crystal board 66 and a second polarizing board 69 placed beneath the liquid-crystal board 66. The liquid-crystal board 66 is thus sandwiched by the first and second polarizing boards 68 and 69. The first polarizing board 68 is used for polarizing a light in the longitudinal direction (or the vertical direction) with respect to the visual-field angle θ of the eyeball 67 of an image viewer. On the other hand, the second polarizing board 69 is used for polarizing the light in the transverse direction (or the horizontal direction) with respect to the visual-field angle θ of the eyeball 67 of an image viewer.

Figure 7A:
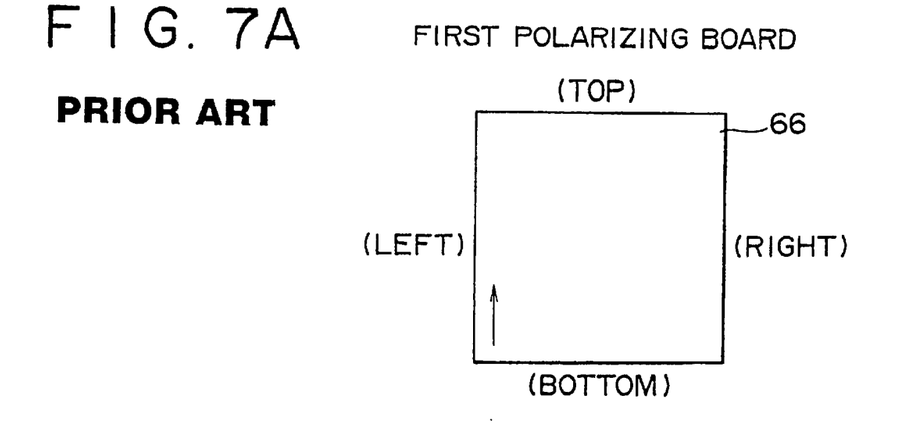
FIGS. 7A to 7C are explanatory diagrams showing a liquid-crystal board as well as first and second polarizing boards provided by the related art seen from the front thereof.
Figure 7B:
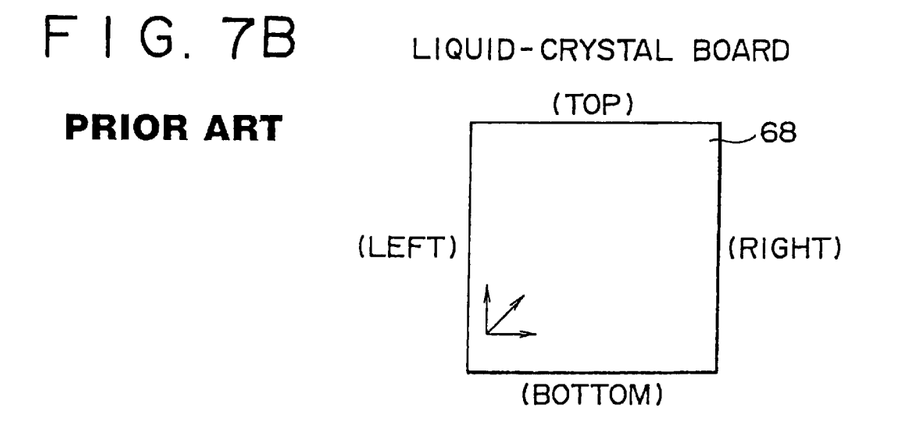
Figure 7C:
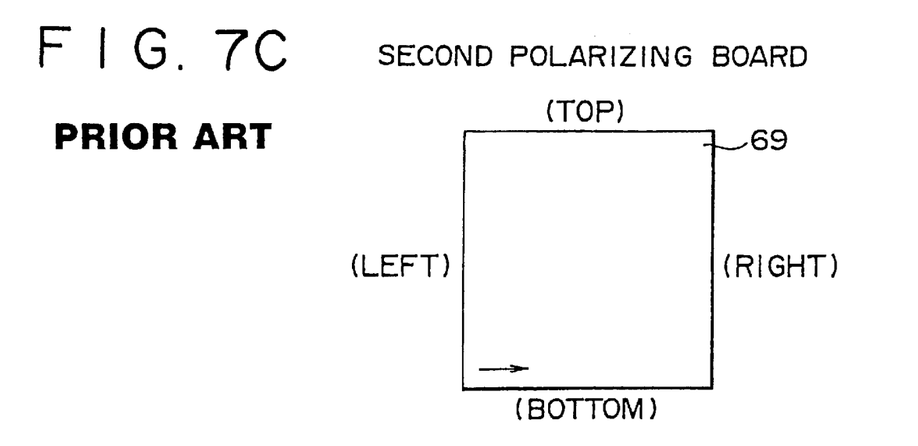

FIGS. 7A to 7C are explanatory diagrams showing the liquid-crystal board 66 as well as the first and second polarizing boards 68 and 69. As shown in FIG. 7B, the liquid-crystal board 66 has a visual-field angle of about 90 degrees in twist orientations with respect to the vertical and horizontal directions as seen from the front thereof. As shown in FIG. 7A, the first polarizing board 68 has a vertical polarizing direction as seen from the front thereof. As shown in FIG. 7C, the second polarizing board 69 has a horizontal polarizing direction as seen from the front thereof.

By placing the display body 59 equipped with the liquid-crystal display element 62 with such a configuration at a location close to both eyes 67 of an image viewer, the contrast characteristics of an image displayed from the liquid-crystal display element 62 are improved in the directions of the visual-field angle θ of the eyeball 67 of an image viewer. To be more specific, the contrast characteristic in the vertical direction with respect to the liquid-crystal board 66 is improved by the first polarizing board 68. On the other hand, the contrast characteristic in the horizontal direction is improved by the second polarizing board 69. As a result, an image displayed from the liquid-crystal board 66 has improved contrast characteristics in the vertical and horizontal directions. That is to say, the so-called optical transmittance is improved in both the vertical and horizontal directions.

However, a liquid-crystal display element that improves the characteristics of the contrast in the vertical and horizontal directions with respect to the directions of the visual-field angle of the liquid-crystal display element provided by the conventional technology described above has a poor contrast characteristic of a visual-field angle from a slanting direction. In order to correct the poor contrast characteristic, the amplitude is increased. When the amplitude is increased, however, part of the screen is inadvertently inverted, giving rise to a problem that a sharp contrast can not be obtained and it is thus impossible to improve the quality of the screen.

In order to solve this problem, the contrast in the horizontal direction with respect to the direction of the visual-field angle is changed. When the contrast is changed in this way, however, the contrast of an image on the right or left side is inadvertently changed in dependence upon the width of the eye, making the eyes of an image viewer become tired easily.

SUMMARY OF THE INVENTION

The present invention addresses the problems described above. It is thus an object of the present invention to provide a liquid-crystal display element having improved contrast characteristics of in the vertical and horizontal directions with respect to the direction of the visual-field angle of the eyeballs of an image viewer wherein changes in contrast in the vertical direction are improved in particular.

In order to achieve the object described above, according to one aspect of the present invention, there is provided an optical visualizing apparatus comprising:

a liquid-crystal display element having contrast characteristics of a visual-field angle in the horizontal and vertical directions;

a half mirror for splitting an optical path from the liquid-crystal display element; and a concave mirror for enlarging and viewing an image based on the optical path from the half mirror as a virtual image, wherein the contrast characteristics of the visual-field angle in the horizontal and vertical directions are changed in accordance with an electrical signal amplified to create a sawtooth waveform and generated in synchronization with a vertical synchronization signal of an input video signal.

According to another aspect of the present invention, there is provided an optical visualizing apparatus comprising:

a liquid-crystal display element having a contrast characteristic of a visual-field angle in the horizontal and vertical directions;

a half mirror for splitting an optical path from the liquid-crystal display element; and a concave mirror for enlarging and viewing an image based on the optical path from the half mirror as an virtual image, wherein the liquid-crystal display element makes the contrast characteristic of the visual-field angle in the horizontal direction fixed but changes the contrast characteristic of the visual-field angle in the vertical direction.

In this way, by improving the contrast characteristic of the visual-field angle in the vertical direction in which an image from the liquid-crystal display element is seen, the quality of the image can be improved and it is possible to prevent the eyes of an image viewer from getting tired easily due to long watching of the image.

BRIEF DESCRIPTION OF THE DRAWINGS

The above and other objects, features as well as many of attendant advantages of the present invention will be readily appreciated as the same becomes better understood by reference to the following figures showing the embodiment of the present invention wherein.

DETAILED DESCRIPTION OF THE PREFERRED EMBODIMENT

The present embodiment will become more apparent from the following detailed description of a preferred embodiment implementing an optical visualizing apparatus serving as an HMD (head mounted display) apparatus having improved characteristics of the contrast in the directions of a visual-field angle provided by the present invention with reference to accompanying diagrams showing the embodiment.

It should be noted that the optical visualizing apparatus provided by the present invention has the same structures as those of the related art which have been explained by referring to FIGS. 1 and 2. The only difference between the optical visualizing apparatus provided by the present invention and that of the related art is the structure of the liquid-crystal display element. For this reason, components of the optical visualizing apparatus provided by the present invention identical with those of the related art are denoted by the same reference numerals used to indicate the latter. Also for the same reason, the explanation of the whole configuration and structure of the optical visualizing apparatus provided by the present invention is omitted.

Figure 3:
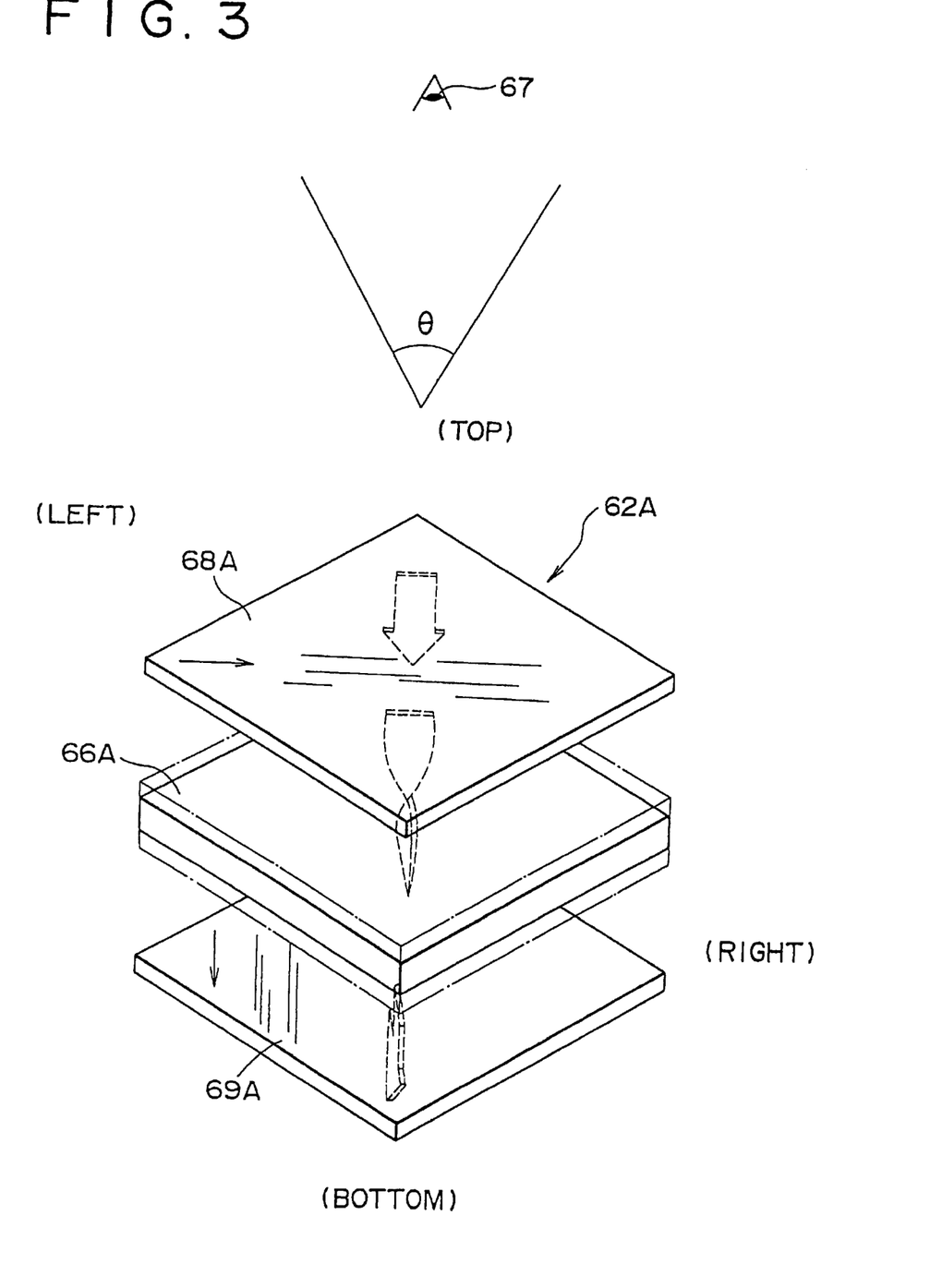
FIG. 3 is an exploded view representation of a liquid-crystal display element provided by the present invention.

FIG. 3 is a diagram showing a liquid-crystal display element 62A provided by the present invention. The liquid-crystal display element 62A has improved characteristics of the contrast in the directions of the so-called visual-field angle θ. Much like the optical visualizing apparatus provided by the related art, the liquid-crystal display element is employed in the display body 59 shown in FIG. 2. Much like the liquid-crystal display element 62 provided by the related art, a liquid-crystal board 66A is sandwiched by first and second polarizing boards 68A and 69A which are provided on both sides of the liquid-crystal board 66A.

Figure 4A:
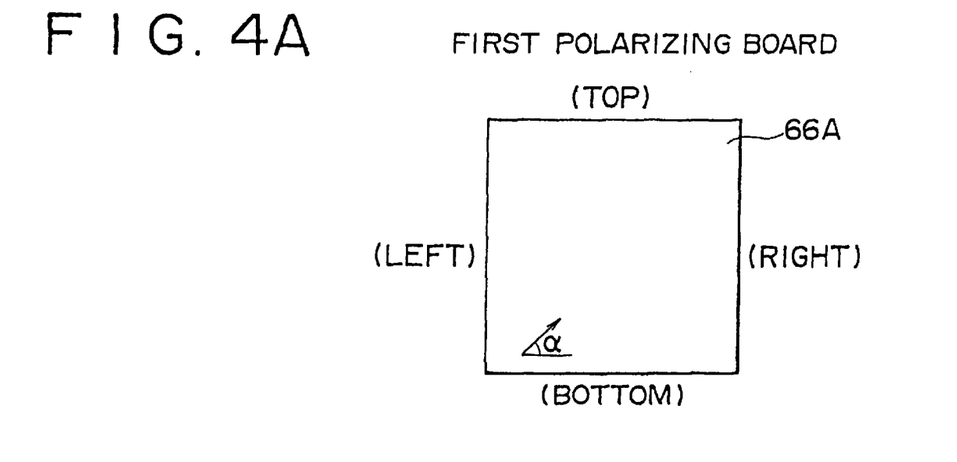
FIGS. 4A to 4C are explanatory diagrams showing a liquid-crystal board as well as first and second polarizing boards seen from the front thereof.
Figure 4B:
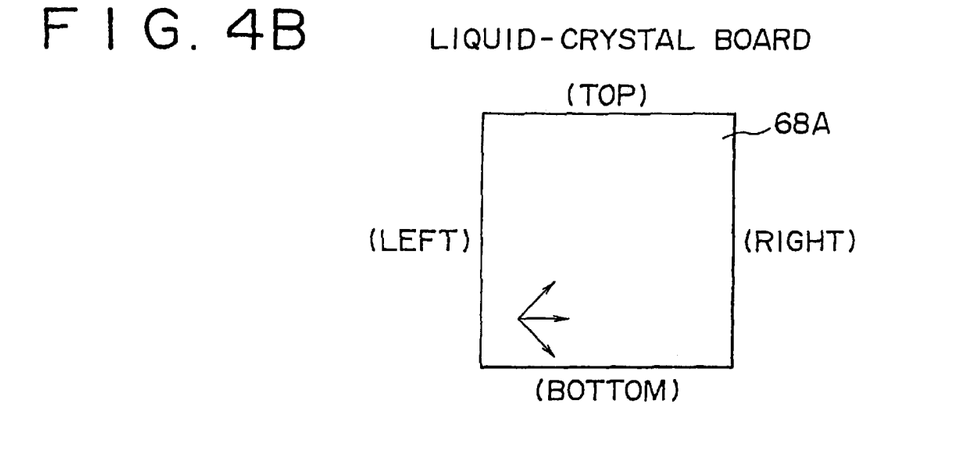
Figure 4C:
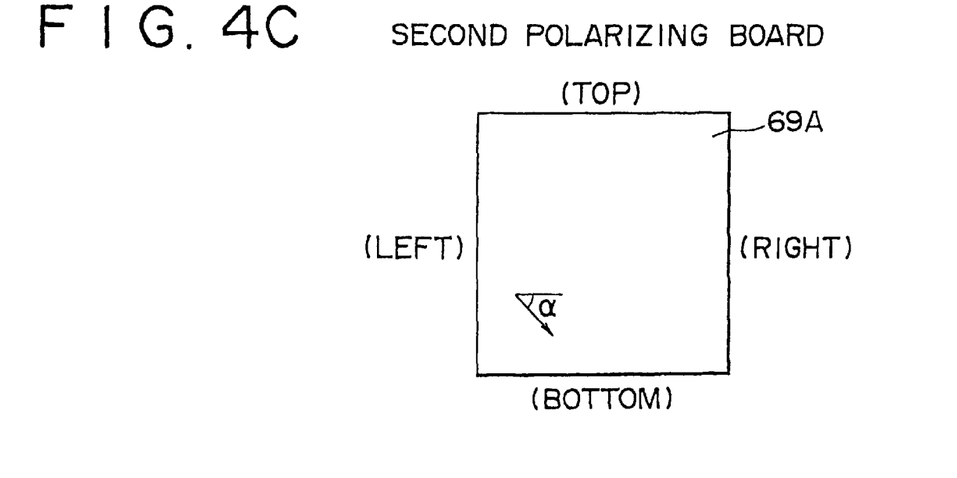

FIGS. 4A to 4C are explanatory diagrams showing the liquid-crystal board 66A as well as the first and second polarizing boards 68A and 69A. As shown in FIG. 4B, the liquid-crystal board 66A having a square shape has visual-field angles facing from the left to the right with a total magnitude of 90 degrees in twist orientations in the vertical and horizontal directions as seen from the front thereof. As shown in FIG. 4A, the first polarizing board 68A has a slanting polarizing direction forming an angle α of 45 degrees with a horizontal line in the upward direction as seen from the front thereof. As shown in FIG. 4C, the second polarizing board 69A has a slanting polarizing direction forming an angle α of 45 degrees with the horizontal line in the downward direction as seen from the front thereof.

In the liquid-crystal display element 62A with the structure described above, the contrast seen from the direction of the visual-field angle θ of the eyeball 67 of an image viewer is polarized in an upward slanting direction with respect to the vertical direction of the first polarizing board 68A having a square shape as indicated by an arrow shown in FIG. 3. Thus, the liquid-crystal display element 62A serves as an element that does not change the contrast in the horizontal direction but can change the contrast in the vertical direction to a maximum. As a result, variations in contrast in the vertical direction occurring in the related art, which changes the contrast in both the vertical and horizontal directions, as well as variations in contrast occurring at the portion on the left side of the lower part and the portion on the right side of the upper portion when seen from the front thereof in particular can be avoided.

Next, a technique for changing the characteristic of the contrast in the vertical direction as is the case with the liquid-crystal display element 62A described above is explained. The technique based on electrical control is explained through the liquid-crystal display element 62 of FIGS. 6 and 7 which has characteristics of the contrast in the horizontal and vertical directions of the related art described earlier.

Figure 5:
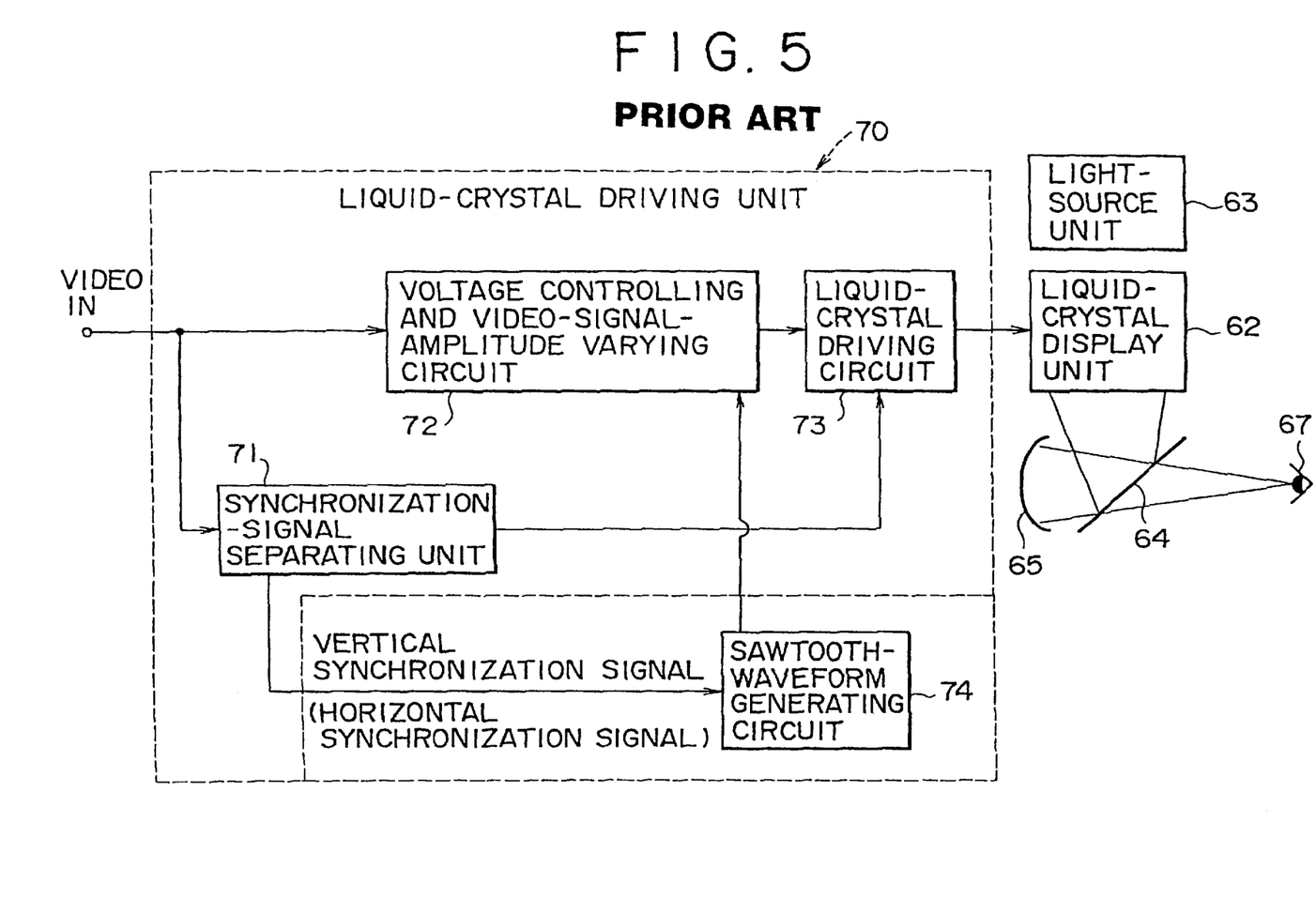
FIG. 5 is a block diagram representing a circuit for controlling the characteristic of the contrast in the vertical direction of the liquid-crystal display element provided by the related art.

FIG. 5 is a diagram showing a circuit for controlling the contrast characteristic in the vertical direction of the liquid-crystal display element 62 shown in FIG. 6 of the related art explained earlier. As shown in FIG. 5, the circuit comprises a liquid-crystal driving unit 70 which is readily available in the market and a sawtooth-waveform generating circuit 74. The liquid-crystal driving unit 70 is implemented as an IC package.

The liquid-crystal driving unit 70 comprises a synchronization-signal separating unit 71 for generating a vertical synchronization signal and a horizontal synchronization signal from an input video signal, a voltage controlling and video-signal-amplitude varying circuit 72 for controlling a voltage applied to the liquid-crystal display element 62 and the amplitude of a video signal, and a liquid-crystal driving circuit 73 for driving the liquid-crystal display element 62 in accordance with the amplitude of the video signal generated by the voltage controlling and video-signal-amplitude varying circuit 72. The input video signal is also supplied to the voltage controlling and video-signal-amplitude varying circuit 72 in addition to the synchronization-signal separating circuit 71.

The sawtooth-waveform generating circuit 74 receives the vertical or horizontal synchronization signal extracted by the synchronization-signal generating circuit 71 employed in the liquid-crystal driving unit 70 and uses the vertical or horizontal synchronization signal as a reference for generating a sawtooth waveform with stepwise increasing amplitude. The sawtooth waveform with a stepwise increasing amplitude is supplied to the voltage controlling and video-signal-amplitude varying circuit 72.

With the liquid-crystal driving unit 70 having the configuration described above, the contrast characteristic of the brightness in the vertical direction can be changed by using the liquid-crystal display element 62 provided by the related art having contrast characteristics in the vertical and horizontal directions.

To put it in detail, first of all, a video signal supplied to the liquid-crystal driving unit 70 is passed on to the synchronization-signal separating circuit 71 for generating a vertical synchronization signal as well as to the voltage controlling and video-signal-amplitude varying circuit 72. The liquid-crystal driving unit 70 generates a voltage for controlling the liquid-crystal display element 62 and a video signal. As described earlier, the sawtooth-waveform generating circuit 74 receives the vertical synchronization signal extracted by the synchronization-signal separating circuit 71 and uses the vertical synchronization signal as a reference for generating a signal with the amplitude thereof amplified in a stepwise fashion to create a sawtooth waveform which is supplied to the voltage controlling and video-signal-amplitude varying circuit 72. Receiving the sawtooth signal with the amplitude thereof amplified stepwise, the voltage controlling and video-signal-amplitude varying circuit 72 controls the voltage of the video signal supplied thereto and varies the amplitude of the video signal in accordance with the amplitude of the sawtooth signal, which is amplified to create a sawtooth waveform. That is to say, the contrast characteristic in the vertical direction is varied in accordance with the vertical synchronization signal. Then, the voltage with a controlled contrast characteristic and the video signal with an amplitude also having a controlled contrast characteristic are supplied to the liquid-crystal driving circuit 73 for driving the liquid-crystal display element 62 in accordance with the vertical synchronization signal.

In this way, by electrically changing the contrast characteristic in the vertical direction of a conventional liquid-crystal display element 62, which traditionally changes the contrast characteristics in the vertical and horizontal directions, the characteristic of the visual-field angle can be improved.

As described above, by fixing the contrast characteristic in the horizontal direction of a liquid-crystal display element employed in an optical visualizing apparatus used as a head mounting display apparatus provided by the present invention but varying the contrast characteristic thereof in the vertical direction, variations in contrast can be prevented from being generated in the vertical direction, resulting in an effect that the characteristic of the visual-field angle can be improved and the eyes of an image viewer can be prevented from getting tired easily.

In addition, in a liquid-crystal display element which is capable of varying the characteristics of the contrast in the vertical and horizontal directions, the contrast characteristic in the vertical direction is varied in accordance with the amplitude of a sawtooth waveform generated from a vertical synchronization signal, that is, the contrast characteristic in the vertical direction is varied electrically, resulting in an effect that the characteristic of the visual-field angle can be improved.

What is claimed is:

1. An optical visualizing apparatus comprising:
   a liquid-crystal display element having contrast characteristics of a visual-field angle in the horizontal and vertical directions;
   a half mirror for splitting an optical path from said liquid-crystal display element; and
   a concave mirror for enlarging and viewing an image based on said optical path from said half mirror as a virtual image,
   wherein said liquid-crystal display element fixes the horizontal contrast characteristic of said visual-field angle in said horizontal direction but changes the vertical contrast characteristic of said visual-field angle.

2. An optical visualizing apparatus according to claim 3 wherein a twist direction of a liquid-crystal board of said liquid-crystal display element and a polarization direction of a polarizing board of said liquid-crystal display element are set in a slanting orientation with respect to a horizontal direction of said polarizing board so as to fix the contrast characteristic of said visual-field angle.

3. An optical visualizing apparatus comprising:
   a liquid-crystal display unit with a fixed contrast characteristic in a horizontal direction;
   a cabinet for firmly mounting said liquid-crystal display unit;
   an optical system for supplying an image from said liquid-crystal display unit to the eyes of a viewer; and
   a correction means for electrically correcting a vertical contrast characteristic of said liquid-crystal display unit.

4. An optical visualizing apparatus according to claim 5 wherein said correction means includes a means for correcting the vertical contrast characteristic in accordance with a vertical synchronization signal.

5. An optical visualizing apparatus according to claim 6 wherein said liquid-crystal display unit is fixed to result in a maximum change in the vertical contrast.

6. An optical visualizing apparatus according to claim 6 wherein said correction means includes a means for correcting said contrast characteristic in said vertical direction.

7. An optical visualizing apparatus according to claim 6 wherein said correction means includes a means for correcting an amplitude characteristic of a video signal into a sawtooth waveform in accordance with said vertical synchronization signal.

* * * * *

UNITED STATES PATENT AND TRADEMARK OFFICE
CERTIFICATE OF CORRECTION

PATENT NO.     : 6,236,438 B1                                          Page 1 of 1
DATED          : May 22, 2001
INVENTOR(S)    : Tetsuya Yagi et al.

It is certified that error appears in the above-identified patent and that said Letters Patent is hereby corrected as shown below:

Column 6,
Line 34, replace "claim 3" with -- claim 1 --.
Line 51, replace "claim 5" with -- claim 3 --.
Lines 55 and 58, replace "claim 6" with -- claim 4 --.

Signed and Sealed this

Sixteenth Day of December, 2003

JAMES E. ROGAN
*Director of the United States Patent and Trademark Office*